United States Patent [19]

Isbrandt et al.

[11] Patent Number: 5,026,606

[45] Date of Patent: * Jun. 25, 1991

[54] FILM FOR THERMAL IMAGING

[75] Inventors: Russell R. Isbrandt, White Bear Township, Ramsey County; Chung I. Young, Roseville, both of Minn.

[73] Assignee: Minnesota Mining and Manufacturing Company, St. Paul, Minn.

[ * ] Notice: The portion of the term of this patent subsequent to Jan. 21, 2003 has been disclaimed.

[21] Appl. No.: 892,204

[22] Filed: Aug. 4, 1986

[51] Int. Cl.[5] ........................ B32B 27/34; B32B 27/30

[52] U.S. Cl. .................................... 428/421; 428/195; 428/447; 428/913; 428/483; 428/480; 430/13; 430/200; 430/211; 430/907

[58] Field of Search ............... 428/195, 447, 913, 421, 428/480, 483; 430/13, 200, 211, 907, 944

[56] References Cited

U.S. PATENT DOCUMENTS

| | | | |
|---|---|---|---|
| 3,936,581 | 2/1976 | Garden | 428/447 |
| 3,955,035 | 5/1976 | Ito et al. | 428/334 |
| 3,986,997 | 10/1976 | Clark | 260/29.2 |
| 4,071,644 | 1/1978 | Grenoble et al. | 427/302 |
| 4,223,072 | 9/1980 | Baney et al. | 428/412 |
| 4,423,139 | 12/1983 | Isbrandt et al. | 430/338 |
| 4,482,608 | 11/1984 | Isbrandt | 428/421 |
| 4,565,714 | 1/1986 | Koshar | 427/54.1 |
| 4,567,133 | 1/1986 | Isbrandt et al. | 430/348 |

*Primary Examiner*—Ellis P. Robinson
*Attorney, Agent, or Firm*—Gary L. Griswold; Walter N. Kirn; David L. Weinstein

[57] ABSTRACT

Film suitable for thermal imaging comprising (1) a substrate formed from a flexible material, (2) a layer of thermally imageable material applied to at least one major surface of the substrate, and (3) a release coating overlying the layer of imageable material, the release coating being the hydrosilation product of (a) a polyorganohydrosiloxane, (b) an ethylenically-unsaturated perfluoropolyether monomer, and (c) an effective amount of a hydrosilation catalyst. Preferably, the film is transparent to visible light. The coating is sufficiently flexible so that the film bearing it can be imaged in commercially available infrared copying machines. Toner powder from plain paper copies will not stick to this coating when the imaging film is processed in a conventional thermal imaging apparatus.

8 Claims, No Drawings

FILM FOR THERMAL IMAGING

BACKGROUND OF THE INVENTION

This invention relates to thermally imageable films, and to a release coating for such films.

Infrared imaging is a form of thermal imaging that involves the use of a focused infrared lamp to heat a sheet bearing an infrared radiation absorbing image, commonly referred to as the "original", which sheet is in contact with a substrate, e.g., a transparent polymeric film, having thermally sensitive imaging chemicals applied to a major surface thereof. Upon image-wise absorbing of the focused infrared radiation, the original transfers the absorbed heat to the thermally sensitive imaging chemicals on the surface of the substrate, thereby causing a chemical reaction which results in the formation of a copy of the image of the original on the substrate.

It is frequently desirable to prepare projection transparencies, e.g., transparencies for overhead projectors, from originals which are actually plain paper copies that have previously been prepared by means of electrophotographic imaging processes. The electrostatic latent image on such a plain paper copy is developed by the application and fixing of toner powder to the plain paper copy. Toner powder is generally a blend of polymer having low melting point, and carbon. When the toner affixed on the surface of a plain paper copy absorbs infrared radiation, partial remelting of the toner powder on the copy is likely to occur. The portions of the original which bear the remelted toner powder will frequently adhere to the surface of the projection transparency. When the original is separated from the transparency, toner powder from the original is likely to be removed from said original and simultaneously transferred to the surface of the thus-formed projection transparency. This transfer of toner powder reduces the optical density of the image on the original and may, in effect, destroy the quality of the original. Thus, the original can be damaged when a projection transparency is made from it. The adherence of the toner powder to the projection transparency may also result in undesirable effects on the surface of the transparency itself. When the image formed on the transparency is black, the toner powder does not harm the image itself, but the toner may be rubbed off the transparency and transfer to surfaces which subsequently come in contact with the transparency. When the image formed on the transparency is a color, the toner powder can cause the colored image to have irregular black spots in the colored image area. This is considered to be a major defect in the transparency. A barrier film interposed between the imageable layer of the transparency and the original can prevent toner powder from being picked up and retained by the transparency. In a type of color transparency currently in use, a film containing an acid does serve as such a barrier.

In addition to the foregoing problems, certain copying machines employ cold pressure fusing to fix toner images. Toner fixed by this method is particularly susceptible to soften and stick to transparency film at the operating temperature of the transparency maker.

Ito, et.al., U.S. Pat. No. 3,955,035 discloses a trialkoxy silane coating which imparts abrasion resistance, hardness, and release properties to plastics. This coating, however, is brittle and will crack if applied to a flexible polyester substrate of the type commonly used for preparing transparencies. Clark, U.S. Pat. No. 3,986,997 discloses a coating formed from a dispersion of colloidal silica in a condensate of methyl trihydroxy silane. This coating is also brittle, and, thus, it is unsuitable for flexible sheeting. Baney, et.al., U.S. Pat. No. 4,223,072. discloses a coating formed of phenyl trihydroxy silane. Although this coating exhibits flexibility superior to that of the coating disclosed in the Clark patent, the flexibility is insufficient to allow coating on thin polyester films. Grenoble, U.S. Pat. No. 4,071,644 discloses a flexible sheet material coated with siloxanes which is useful as a non-adherent surface. The coating composition in this patent comprises vinyl alkyl siloxane oligomers, alkyl hydrogen siloxanes, and a catalyst. These coatings are curable at 250° F. (121° C.), a temperature at which a temperature sensitive coating such as that required for infrared imageable films and thermally imageable films would react prematurely. Garden, et.al., U.S. Pat. No. 3,936,581 discloses a release coating containing vinyl siloxanes in mixture with alkyl hydrogen siloxanes and a platinum catalyst. The optimum cure temperatures are in excess of 100° C., a temperature which would bring about premature reaction of the temperature sensitive coatings of infrared imageable films.

SUMMARY OF THE INVENTION

This invention involves a film suitable for thermal imaging which comprises (1) a substrate formed from a flexible material, (2) a layer of thermally imageable material applied to at least one major surface of the substrate, and (3) a release coating overlying the layer of imageable material, the release coating being the hydrosilation product of (a) a polyorganohydrosiloxane, (b) an ethylenically-unsaturated perfluoropolyether monomer, and (c) an effective amount of a hydrosilation catalyst. Preferably, the film is transparent to visible light.

The release coating composition can be applied to the imageable film by conventional means. The coating is sufficiently flexible so that the film bearing it can be imaged in commercially available infrared copying machines, e.g , 3M Model 45 infrared copier. Toner powder from plain paper copies will not stick to this coating when the imaging film is processed in a conventional thermal imaging apparatus, e.g., an infrared copier.

DETAILED DESCRIPTION

The type of film contemplated for use in the present invention is any imageable film which can be imaged by being exposed to thermal energy, e.g. infrared radiation, while in surface-to-surface contact with an original. Preferably, the film, i.e. the substrate and imageable coating thereon, is transparent to visible light.

A particularly appropriate type of thermally imageable film contemplated for use in the present invention is described in Isbrandt, et.al., U.S. Pat. No. 4,423,139, incorporated herein by reference. This film can be imaged by means of infrared radiation. This film comprises a polymeric film substrate transparent to visible light, bearing an imageable layer on at least one surface thereof. Substrate materials which are suitable for this invention include polycarbonates, polyesters, polyacrylates, polystyrene, and polypropylene. A preferred substrate is polyvinylidene chloride primed polyester film. The preferred polyester is polyethylene terephthalate.

The imageable layer comprises a nitrate salt, e.g., nickel nitrate, at least one leuco dye, e.g., 3,7-di(N,N-diethylamino)10-benzoyl phenoxazine, and a binder, e.g., cellulose acetate butyrate, one or more aromatic compounds which form quinones, diimines, or quinonimes upon oxidation, e.g., catechol, and 1-phenyl-3-pyrazolidinone or derivatives thereof. The layer can also contain a material which supplies hydrogen ions, e.g., an acidic material such as phthalic acid. Upon the application of a sufficient amount of thermal energy, the nitrate salt will oxidize the leuco dye, resulting in a change in color.

Other thermally imageable films that are suitable for use in the present invention are described in Owen, U.S. Pat. No. 2,910,277; Grant, U.S. Pat. No. 3,080,254; and Newman et.al., U.S. Pat. No. 3,682,684, all of which are incorporated herein by reference. Owen describes a heat-sensitive chemically reactive copy-sheet comprising a thin flexible carrier web coated with a visibly heat-sensitive coating comprising (1) a film-forming binder, (2) a noble metal salt of an organic acid, and (3) a cyclic organic reducing agent for the noble metal ions, having an active hydrogen atom attached to an atom which is selected from the class of oxygen, nitrogen and carbon atoms and is directly attached to an atom of the cyclic ring. Grant describes a heat-sensitive copy sheet comprising the same ingredients as contained in Owen and further including a sufficient amount of phythalazine to cause observable darkening of the thermographic image. In both Owen and Grant, the preferred film-forming binder is polystyrene resin, the preferred noble metal salts of organic acid are silver behenate and silver stearate, and the preferred reducing agents are 3,4-dihydroxybenzoic acid and methyl gallate. Newman et al. describes a heat-sensitive sheet material including a thin visibly heat-sensitive layer having wide exposure latitude and comprising a mixture of ferric and silver soaps of long chain fatty acids, a toner for the silver image, and a phenolic co-reactant for the soaps. An example of ferric and silver soap mixture is ferric stearate and silver behenate. An example of a toner is phthalazinone, and examples of phenolic co-reactants for the soaps are pyrogallic acid, catechol, 3,4-dihydroxybenzoic acid, methyl gallate, and behenoyl pyrogallol.

The curable composition that can be used to provide the release coating for the film of this invention comprises (1) a polyorganohydrosiloxane comprising at least two hydrogen atoms attached to a silicon atom or atoms, with no more than two hydrogen atoms being on any one silicon atom, and having a number average molecular weight of from 106 to about 50,000;

(2) an ethylenically-unsaturated perfluoro-polyether monomer having segments comprising a plurality of repeating units of the formula $-C_aF_{2a}O-$, in which "a" in each unit represents independently an integer of 1 to 4, and at least one ethylenically-unsaturated group, the monomer preferably having a number average molecular weight of at least 500, most preferably 500 to 20,000; and (3) an effective amount of a hydrosilation catalyst for bringing about the condensation of the polyorganohydrosiloxane and the ethylenically-unsaturated perfluoropolyether monomer.

This composition is more fully described in U.S. Pat. No. 4,565,714, incorporated herein by reference. Preferably, the composition, when cured, is transparent to visible light.

Polyorganohydrosiloxanes that can be used in the composition of the release coating include cyclopolyorganohydrosiloxanes having the empirical formula $$(R_2SiO)_b \qquad I$$

and the preferred linear and branched polyorganohydrosiloxanes having the general formula

II

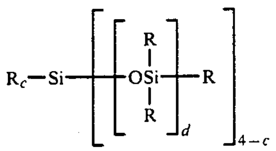

wherein each R independently represents hydrogen or a substituted or unsubstituted organic group selected from linear alkyl groups having, for example, 1 to 12 carbon atoms, branched alkyl or cycloalkyl groups having, for example, 3 to 7 carbon atoms, alkoxyalkyl groups having, for example, 1 to 3 carbons in the alkoxy group, and phenyl groups, the substituting group or groups being selected from one or more halogen (e.g., chlorine, fluorine, bromine), alkyl groups having from 1 to 4 carbon atoms, trifluoroalkyl, alkyland fluoroalkylcarbonyl-amido and -sulfonamido groups in which the alkyl group is linear, branched, or cyclic (preferably linear) and having one to 18 carbon atoms; and at least two but not more than 70 percent of all R groups being hydrogen;

represents an integer having a value of 3 to 18;

c represents 0, 1, 2, or 3; and d represents an integer having a value of one to about 300.

The polyorganohydrosiloxanes and their preparation are well known in the art and are disclosed, for example, in Ashley, U.S. Pat. No. 3,159,662; Lamoreaux, U.S. Pat. No. 3,220,972; and Joy, U.S. Pat. No. 3,410,886, which are incorporated herein by reference.

Preferred polyorganohydrosiloxanes, because of their availability, are the linear polymethylhydrosiloxanes represented by the structure;

III

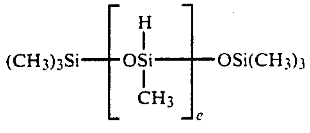

wherein e represents an integer having a value of about 5 to 300.

Preferred ethylenically-unsaturated perfluoropolyether monomers useful in the composition of the invention can be represented the formula $$Q_gX(C_aF_{2a}O)_fC_aF_{2a}Z \qquad IV$$

wherein

Q represents an ethylenically-unsaturated group represented by the formula

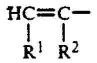

in which $R^1$ and $R^2$ independently represent hydrogen, alkyl, phenyl, phenylalkyl, or alkylphenyl in which alkyl has 1 to 4 carbon atoms and is linear, branched, or cyclic, and $R^1$ and $R^2$ are preferably hydrogen;

g represents an integer having a value of 1 or 2;

X represents a polyvalent linking group linking one or two Q groups to a perfluoropolyether segment, X being divalent when g is one and trivalent when g is two;

$(C_aF_{2a}O)_fC_aF_{2a}$ represents a perfluoropolyether segment comprising a chain of f units, $(C_aF_{2a}O)$, in which "a" in each unit independently represents an integer of 1 to 4 and f represents a number having a value of at least one, preferably an average of about 3 to 500; and Z represents $-OC_aF_{2a+1}$ or $-XQ_g$ and Z preferably represents $-XQ_g$ in which A, X, Q and g are as defined above.

Particularly preferred are the ethylenically-unsaturated perfluoropolyether monomers of the formula $$H_2C{=}CHCH_2OCH_2CF_2O(CF_2CF_2O)_m(CF_2O)_nCF_2CH_2OCH_2CH{=}CH_2 \qquad V$$

wherein m and n represent numbers designating the number of randomly distributed perfluoroethyleneoxy and perfluoromethyleneoxy repeating units, respectively, m and n independently having values from 1 to 300 and the ratio m/n is 0.2/1 to 5/1.

In general, the curable compositions can contain from about 2 to about 35 weight percent of the polyorganohydrosiloxanes of formulae II or III with from about 65 to about 98 weight percent of the ethylenically-unsaturated perfluoropolyethers of formulae IV or V, the weight percent being based on the weight of the total composition.

The hydrosilation catalysts useful in the release coating compositions of the present invention include all of the well-known metal-containing catalysts which are effective for catalyzing a hydrosilation reaction between silicon-bonded hydrogen groups and ethylenically-unsaturated groups. These materials include, for example, the finely divided platinum catalysts, such as those described in U.S. Pat. No. 2,970,150, the chloroplatinic acid catalysts described in U.S. Pat. No. 2,823,218, the platinum hydrocarbon complexes taught in U.S. Pat. Nos. 3,159,601, 3,159,662, as well as the platinum alcoholate catalysts described in U.S. Pat. No. 3,220,972, and platinum complexes having an ultraviolet displaceable group such as are disclosed in U.S. Pat. No. 4,530,879 and the (cyclopentadienyl) (trialiphatic) platinum complexes such as are disclosed in U.S. Pat. No. 4,510,094. In addition, the platinum chloride-olefin complexes described in U.S. Pat. No. 3,416,946 are useful herein. All of the teachings of hydrosilation catalysts in the aforesaid U.S. patents are incorporated herein by reference.

When a platinum catalyst is employed, it is generally present in an amount related to the amount of the ethylenically-unsaturated radicals in the perfluoropolyether monomer and in an amount sufficient to cause the co-reaction of the ethylenically-unsaturated perfluoropolyether monomer and the polyorganohydrosiloxane. Satisfactory results may be obtained when the platinum catalyst is present in amounts sufficient to provide as little as one part by weight of platinum per million parts by weight of perfluoropolyether monomer. On the other hand, amounts of the platinum catalyst sufficient to provide as high as one to ten parts by weight of platinum per 1,000 parts of perfluoropolyether monomer may also be used. In general, however, it is preferred to employ the platinum catalyst in an amount sufficient to provide one to two hundred parts by weight of platinum per one million parts by weight of perfluoropolyether monomer. Also, metals such as rhodium, iridium, and palladium, and their compounds, are known to catalyze these hydrosilation reactions and their use is intended to be within the scope of the present invention. Platinum compounds are the preferred catalysts.

Solvents that are preferred for applying the release coating composition to the substrate include fluorocarbons, such as 1,1,2-trichlorotrifluoroethane and perfluorooctane.

Application of the composition can be carried out by coating techniques such as brushing, wire-wound rod coating, knife coating, spraying, curtain coating, and gravure coating having, for example, 80 lines per centimeter.

The release coat material is preferably applied to a substrate by the steps of (a) providing a composition of the polyorganohydrosiloxane, the ethylenically-unsaturated perfluoropolyether monomer, the hydrosilation catalyst, and optionally other additives either with or without solvents, such as at least one halogen-containing organic solvent,
(b) coating the composition onto a substrate,
(c) removing the solvent when used, and
(d) curing the composition by application of heat at 25° to 85° C. or electron beam depending on the hydrosilation catalyst in the mixture, for a suitable period of time from a fraction of a second to five minutes or more. A substantial post-cure period at ambient temperature (25° C.) may be required. Such a period may extend for several days.

The thickness of the release coating can be controlled to obtain optimum performance. The preferred range of coating weight is from about 0.05 $g/m^2$ to about 0.538 $g/m^2$. The most preferred range is from about 0.05 $g/m^2$ to about 0.108 $g/m^2$. Very low coating weights are preferred when electron beam curing is used in order to allow curing with electron beam dosages sufficiently low to prevent the imaging chemicals from reacting. Coating weights in excess of 0.538 $g/m^2$ are acceptable, but coating weights greatly in excess of that amount tend to become soft and to deform upon exposure to heat. This deformation can lead to irregularities in image areas, resulting in light scattering, which in turn can produce dark spots in the projected image.

In some situations, a barrier coat must be interposed between the layer bearing the imaging chemicals and the release coating in order to permit the release coating to cure. An example of a suitable substance for barrier coats is polyvinyl butyral (e.g., "Butvar B-72", commercially available from Monsanto).

As a formulation for preparing a release coating for thermally imageable films, the composition described herein is superior to those in conventional use for the following reasons:

(1) the composition can be coated with a high speed coating apparatus, e.g., rotogravure, reverse roll;
(2) the cured coating allows better release than coatings currently used in the art;
(3) the cured coating has good release from toner powder with the result that toner powder will not adhere to the surface of the film.

The thermally imageable film of this invention is particularly useful for preparing transparencies for overhead projection by means of commercially available infrared copying machines, e.g., 3M Model 45 infrared copier.

The imageable film of the present invention is also quite useful in thermal printing devices, such as the Hewlett-Packard 9800 series. The thermal print heads are extremely hot, e.g., greater than 100° C., and they have a tendency of picking off the thermally imageable materials from the substrate, resulting in fouled print heads. The cohesive strength of the coating, combined with its low coefficient of friction, render it useful for separating the print head from the thermally imageable materials.

The following example presents specific illustrations of the present invention. It should be understood that the invention is not intended to be limited to specific details to be set forth therein.

EXAMPLE I

In this example, the transparent infrared imageable film was 4 mil (100 μm) thick polyethylene terephthalate sheet bearing on one major surface thereof an imageable layer coated from a formulation containing the following ingredients in the amounts indicated:

| Ingredient | Amount |
|---|---|
| Nickel nitrate [$Ni(NO_3)_2$] | 0.102 g |
| 2(2'-hydroxy-5'-methylphenyl-benzotriazole | 0.100 g |
| 1(3-bromo-4N,N-dimethylaminophenyl)-2(2'-5'-chloro-1',3',3'-trimethylindolyl)ethene | 0.084 g |
| Phthalic acid | 0.116 g |
| 1-Phenyl-3-pyrazolidinone | 0.102 g |
| Catechol | 0.007 g |
| Vinylidene chloride-acrylonitrile copolymer (Saran ® F-310, available from Dow Chemical Company) | 1.500 g |
| Wetting agent (Fluorad ® FC-430, fluorinated alkyl ester available from Minnesota Mining and Manufacturing Company) | 0.001 g |
| Tetrahydrofuran | 1.333 g |
| Methyl ethyl ketone | 4.980 g |

Prior to coating, the above formulation was scaled-up 1500X and rotogravure coated with a 79.4 lines/in. knurl at 125 ft/min, with an oven dwell time of 68 seconds at a temperature of 180° F. (82° C.).

A stock solution of the release coating composition was prepared as follows:

An ethylenically-unsaturated perfluoropolyether (5.0 g) having the formula $$CH_2{=}CH{-}CH_2{+}O{-}CH_2{-}CF_2O(C_2F_4O)_m(CF_2O)_n{-}CF_2{-}CH_2{-}CH{=}CH_2$$

was mixed with a polyorganohydrosiloxane (0.183 g) having the formula

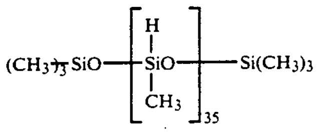

and 200 ppm platinum catalyst (platinum divinylsiloxane) in 200 ml solvent (Freon ® 113). The mixture had a pot life of about 24 hours.

The imageable layer of a first sample of thermally imageable film was overcoated with the foregoing release coating composition with a knife coater. The coating was cured at 180° F. for 4½ minutes.

The imageable layer of a second sample was coated with the previously described stock solution diluted to 0.5% solids. The coating was cured at 150° F. for 3 minutes. The cure was not uniform.

The imageable layer of a third sample was coated with the previously described stock solution diluted to 0.1% solids. The coating was cured at 180° F. for 4 minutes.

Originals were generated with a Xerox ® 3100 thermal fixing copier and a Canon ® NP 120 cold pressure fixing copier.

Transparencies were prepared from the foregoing originals by means of a 3M Model 45 transparency maker. The results of toner release are shown in Table 1:

TABLE 1

| Copier which produced original | Quality of release % solids in release coating composition 2.5% | 0.5% | 0.1% |
|---|---|---|---|
| Xerox ® 3100 | Excellent | Good | Poor |
| Canon ® NP 120 | Excellent | Good | Poor |

Identical plain paper copies were employed as originals to determine the relative amount of toner adhering to the thermally imageable film. The effectiveness of the release coating was measured by comparing the optical density values on release coated and uncoated film from the same lot. The optical densities were measured with a MacBeth Model TD504AM densitometer. The treated and untreated samples of film substantially similar but not identical to those described previously were fed through the transparency maker side-by-side so that both were exposed to identical conditions. The results are shown in Table 2.

TABLE 2

| Copier which produced original | | Untreated film Filter Green | Blue | Yellow | Red | Treated film Filter Green | Blue | Yellow | Red |
|---|---|---|---|---|---|---|---|---|---|
| Xerox ® 3100 | X[1] | 0.82 | 0.43 | 0.95 | 0.43 | 0.71 | 0.32 | 0.82 | 0.32 |
| | S[2] | 0.067 | 0.080 | 0.069 | 0.063 | 0.018 | 0.022 | 0.018 | 0.01 |
| Canon ® NP 120 | X[1] | 0.94 | 0.51 | 1.02 | 0.52 | 0.82 | 0.42 | 0.92 | 0.41 |
| | S[2] | 0.059 | 0.044 | 0.039 | 0.036 | 0.102 | 0.110 | 0.098 | 0.082 |
| Printed Image | X[1] | 0.84 | 0.31 | 0.92 | 0.50 | 0.82 | 0.30 | 0.90 | 0.48 |

TABLE 2-continued

| Copier which produced original | | Untreated film Filter Green | Blue | Yellow | Red | Treated film Filter Green | Blue | Yellow | Red |
|---|---|---|---|---|---|---|---|---|---|
| (no toner) | $S^2$ | 0.012 | 0.020 | 0.014 | 0.011 | 0.023 | 0.028 | 0.020 | 0.012 |

[1]X represents the average of 8 to 10 readings.
[2]S represents the standard deviation.

In all runs, the treated film had lower image optical density than the untreated film. This difference is due principally to residual toner powder which was transferred from the original to the thermally imageable film.

Untreated thermally imageable film, i.e., film not having a release coating, should remove more toner from an original, i.e., a plan paper copy bearing removable toner powder, than should a thermally imageable film treated with the release coating of the present invention. The toner which adheres to the untreated film will block light and thereby raise the transmission optical density readings. Untreated imageable film nd treated imageable film should give the same optical density readings when the image is prepared from a printed original, i.e., an original having no removable toner, assuming that the films are selected from the same lot. This was indeed true. When untreated polyester film having no image receiving layer was used, only the base optical density of the film was observed. When a plain paper copy original having removable toner was used to produce a transparency with untreated polyester film having no image receiving layer, an image resulting from removed toner was observed and measured.

A transparency prepared from a toned original and a thermally imageable film treated with an effective toner release coating should exhibit a lower optical density reading than a transparency prepared from a toned original and an untreated thermally imageable film from the same lot, solely due to the absence of adhering over material on the treated film. This was shown to be true.

Various modifications and alterations of this invention will become apparent to those skilled in the art without departing from the scope and spirit of this invention, and it should be understood that his invention is not to be unduly limited to the illustrative embodiments set forth herein.

What is claimed is:

1. Thermally imageable film comprising a substrate, a layer of thermally imageable material applied to at least one major surface of said substrate, and a release coating overlying the layer of imageable material, said release coating being the hydroxilation product of (a) a polyorganohydrosiloxane, (b) an ethylenically-unsaturated perfluoroether monomer, and (c) an effective amount of a hydrosilation catalyst.

2. The film of claim 1 wherein said release coating is the reaction product of (1) a polyorganohydrosiloxane comprising at least two hydrogen toms attached to a silicon atom or atoms, with no more than two hydrogen atoms being on any one silicon atom, and having a number average molecular weight of from 106 to about 50,000;

(2) an ethylenically-unsaturated perfluoro-polyether monomer having segments comprising a plurality of repeating units of the formula —$C_aF_{2a}O$—, in which "a" in each unit is independently an interger of 1 to 4, and at least one ethylenically-unsaturated group, and (3) an effective amount of a hydrosilation catalyst for brining about the condensation of the polyorganohydrosiloxane and the ethylenically-unsaturated perfluoropolyether monomer.

3. The film of claim 2 wherein said polyorganohydrosiloxane comprises from about 2 to about 35 weight percent of the release coating composition and said ethylenically-unsaturated perfluoropolyether comprises from about 65 to about 98 weight percent of the release coating composition.

4. The film of claim 1 wherein said film is transparent to visible light.

5. The film of claim 1 wherein the substrate is polymeric film.

6. The film of claim 3 wherein said polymeric film substrate is polyethylene terephthalate.

7. The film of claim 1 wherein the imageable material comprises a binder, nitrate salt, and at least one leuco dye.

8. Method of preparing a transparency by means of a thermal imaging process comprising the steps of (a) contacting an image-bearing original with the film of claim 4, (b) applying thermal energy to the original whereby the original image wise absorbs said thermal energy and transfers said thermal energy to the transparent film to form a copy of the image of the original on the transparent film, and (c) separating said original from said transparent film.

* * * * *

UNITED STATES PATENT AND TRADEMARK OFFICE
CERTIFICATE OF CORRECTION

PATENT NO. : 5,026,606

DATED : June 25, 1991

INVENTOR(S) : Isbrandt et al.

It is certified that error appears in the above-identified patent and that said Letters Patent is hereby corrected as shown below:

Col. 2, line 6, delete the period after 4,223,072.
Col. 4, line 32, "alkyland" should be --alkyl- and--.
Col. 4, line 37, before "represents" insert --b--.
Col. 8, first formula:

"$CH_2=CH=CH_2+O-CH_2-CF_2O(C_2F_4O)_m(CF_2O)_n-CF_2-CH_2-CH=CH_2$" should be --$CH_2=CH-CH_2-O-CH_2-CF_2O(C_2F_4O)_m(CF_2O)_n-CF_2-CH_2-O-CH2-CH=CH_2$--.

Col. 9, line 22, "nd" should be --and--.
Col. 9, line 40, "over" should be --toner--.
Col. 9, line 45, "his" should be --this--.
Col. 9, line 53, "hydroxilation" should be --hydrosilation--.
Col. 10, line 14, "toms" should be --atoms--.
Col. 10, line 26, "brining" should be --bringing--.
Col. 10, line 49, "image wise" should be --imagewise--.

Signed and Sealed this

Twenty-fifth Day of January, 1994

Attest:

Bruce Lehman

BRUCE LEHMAN

Attesting Officer

Commissioner of Patents and Trademarks